Oct. 4, 1966   J. D. KING   3,276,249
ULTRASONIC MEASURING APPARATUS
Filed Sept. 24, 1962   2 Sheets-Sheet 2
*Fig. 2*
*Fig. 3*
*Fig. 4*
*Fig. 5*
*Fig. 6*
*Fig. 7*
*Fig. 8*
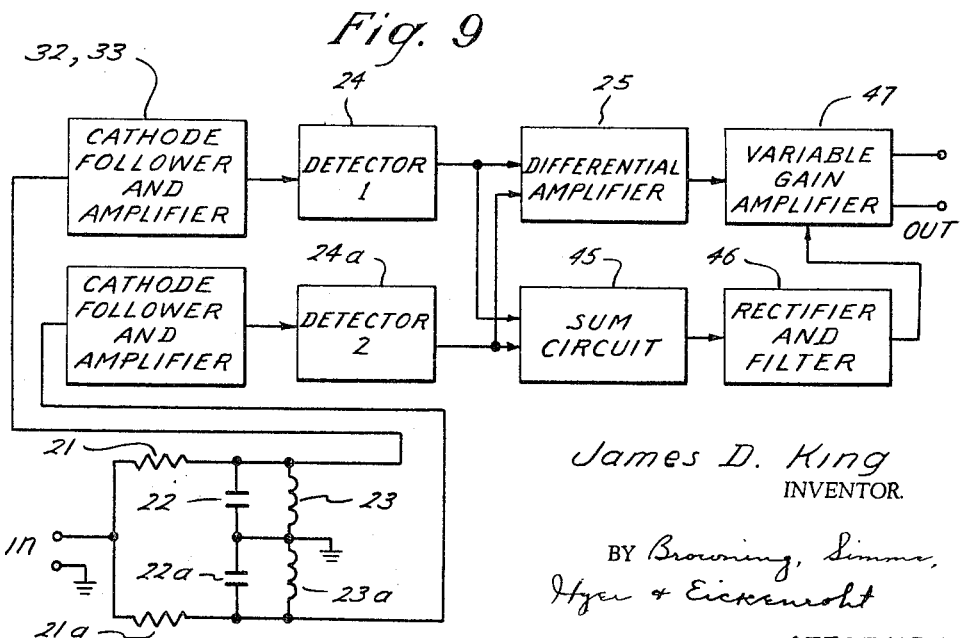
James D. King
INVENTOR.
BY Browning, Simmons,
Hyer & Eickenroht
ATTORNEYS United States Patent Office 3,276,249
Patented Oct. 4, 1966

3,276,249
ULTRASONIC MEASURING APPARATUS
James D. King, San Antonio, Tex., assignor, by mesne assignments, to Southern Gas Association, Dallas, Tex., a corporation of Georgia, and American Gas Association, New York, N.Y., a corporation of New York
Filed Sept. 24, 1962, Ser. No. 225,441
8 Claims. (Cl. 73—67.8)

This invention relates to apparatus for the ultrasonic inspection of an object by measuring the fundamental frequency, or the departure of the same from a preselected frequency, of a burst of oscillations resulting from the application of ultrasonic waves to the object so that the fundamental frequency is a function of a characteristic of the object being inspected. In another aspect, it relates to the ultrasonic measurement of the thickness of an object by measuring the departure of the fundamental frequency of reflected ultrasonic waves from a norm. In another of its aspects, it relates to ultrasonic apparatus for generating short bursts of electrical signals representative of reflected ultrasonic waves and then measuring the fundamental frequency of the oscillations in the bursts to determine a variable, such as the thickness, of an object being inspected.

It is sometimes desirable to measure the fundamental frequency of electrical signals which occur in short bursts of oscillation. Moreover, this measurement is desired despite the fact that there is no definite phase relationship between the oscillation in one burst and the oscillations in other bursts. Also, the measurement should be independent of the rate of recurrence of the bursts. For example, it has been proposed to measure the thickness of a material by subjecting it to a damped ultrasonic signal occurring as a burst of oscillation. Portions of this signal are reflected back from the closest and farthest surfaces of the material under measurement while the balance of the signal is reflected back and forth between the two surfaces with some energy being lost at each surface. As a result, a series of signals are received by a sensing transducer which generates a burst of oscillation, the fundamental frequency of which is proportional to the thickness of the material being measured.

In making the thickness measurments on a continuous basis by moving the ultrasonic apparatus relative to the material being measured, it will be seen that not only will the fundamental frequency of the oscillations of the bursts vary from time to time due to changes in thickness of material, but also that the time intervals between bursts may vary due to variations in spacing between the material and the transducers, etc. Moreover, these and other factors usually do cause the variations in the phase relationships between the oscillations in one burst and in other bursts. It would therefore be very desirable to provide an apparatus which can measure the thickness or other characteristic of an object by measuring the fundamental frequency of the oscillations of the burst without these various factors affecting the measurement and it is a general object of this invention to provide such an apparatus.

Another object is to provide such an apparatus which will measure the fundamental frequency of each burst of oscillation even if no definite phase relationship exists between the oscillations in succeeding bursts.

Another object is to provide such as an apparatus wherein the frequency measurement is independent of the rate of recurrence of the bursts.

Another object is to provide such an apparatus which will indicate or measure the deviation of the fundamental frequency of a burst of oscillation from a chosen frequency.

Another object is to provide such an apparatus in which the deviation of the fundamental frequency to be measured from a chosen frequency can be measured even though the magnitude and wave shape of the bursts of oscillation may vary from burst to burst.

Another object is to provide such an apparatus which has a high speed response so that it can measure the fundamental frequency of each burst of rapidly recurring bursts of oscillation, thereby permitting high speed automation of a thickness measuring technique which would not be possible with apparatus using slowly reacting components such as capacitors to store energy reflecting the changes in thickness of an object.

Other objects, advantages and features of the invention will be apparent to one skilled in the art upon consideration of the specification, claims and the drawings wherein:

FIG. 1A is a graphical representation of the resonance curves of the tuned channels of FIG. 1;

Figure 1:
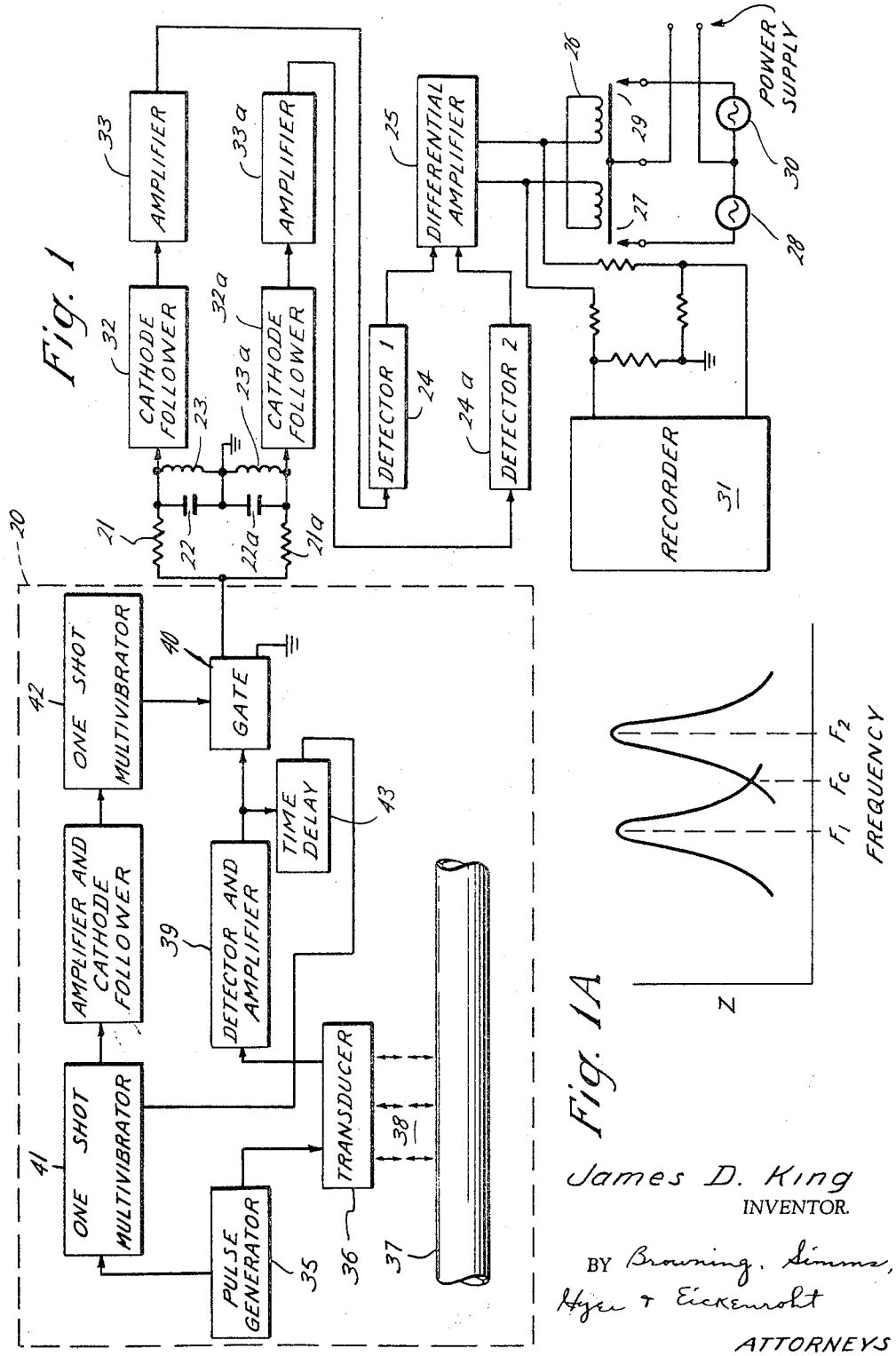
FIG. 1 illustrates a circuit embodying the invention in one of its preferred form.

FIGS. 2 to 8, inclusive, are illustrations of the various signals as they may appear in the circuit of FIG. 1; and FIG. 9 illustrates another form of the invention similar to that of FIG. 1 except that certain components have been added to minimize the effects of certain changing input signal characteristics.

Like characters of reference will be used throughout the several views to designate like parts.

Referring now to FIG. 1, there is illustrated an ultrasonic inspection circuit 20 which generally applies bursts of ultrasonic waves to an object being inspected and converts the reflected waves into an output comprising a plurality of separate, spaced-apart bursts of electrical signals, each burst having a fundamental frequency which is a function of a property or a characteristic of the object being inspected such as, for example, the thickness of the object. Further description of the illustrated circuit 20 will be given below but for the moment, it is sufficient to note that the signal output from the device 20 can be as illustrated in FIG. 2.

The function of the circuit shown exteriorly of the dashed enclosure around circuit 20 is to measure the fundamental frequency of the oscillations in each of the bursts such as are shown in FIG. 2. To do this, a pair of tuned L–C–R circuits are provided, respectively comprising resistor 21, capacitor 22, inductance 23 and resistor 21a, capacitor 22a and inductance 23a. For the sake of convenience, the two circuits containing these L–C–R components will sometimes hereafter be referred to as the "upper" and "lower" channels. Thus, each channel has underdamped L–C–R circuits and each is tuned to a resonant frequency differing from each other by a desired amount to either side of a center frequency. However, the difference in resonant frequencies is made small enough that both L–C–R circuits are shock excited by any signal having a fundamental frequency between the two resonant frequencies.

As noted above, each L–C–R circuit is constructed so that the value of resistances 21 and 21a are made large enough that the corresponding L–C circuits are underdamped; that is, the value of R is made larger than that required to critically damp the L–C circuits. As a result, when the fundamental frequency of the incoming signal burst is equal to the resonant frequency of the L–C–R circuit, the amplitude of ringing of the L–C–R circuit will be maximum and the ringing will continue for the greatest length of time. As the fundamental frequency of the incoming signal burst departs from resonance with the L–C–R circuit, both the amplitude and the length of ringing time will decrease. When the incoming signal burst is at a frequency equal to the center frequency of the two channels, the output of the two L–C–R circuits will be equal and as the input frequency changes to be closer to one resonant frequency of one channel, the output of that channel will increase both in amplitude and length of time while that of the other channel will decrease. When the input signal changes in frequency toward the other channel, the output of the first channel will decrease while that of the second will increase, as will be more fully explained below.

Means are provided for comparing the outputs of the two L–C–R circuits in order to determine the fundamental frequency of the incoming bursts of oscillations. Thus, each channel can have detectors 24 and 24a which detect the envelopes of the ringing bursts of FIG. 2 to provide an output as shown in FIG. 4 for the upper channel and an output as shown in FIG. 5 for the lower channel. The outputs of the detectors can be compared in a differential amplifier or difference circuit 25. In this circuit, the ringing envelopes produced by each input burst are compared individually in a difference circuit so that the output produced by the difference circuit, when the channel inputs thereto are unequal, is a series of wave forms occurring at the repetition rate of the input bursts of oscillations.

Assuming that the fundamental frequency of the incoming signal bursts is equal to the center frequency between the two tuned circuits, the output of the detectors 24 and 24a will be as shown in FIG. 6 (i.e., zero output). Thus, the amplitude and wave shape of the detected ringing envelopes will be the same in both channels and no signal output will be produced by the difference circuit 25. If the input fundamental frequency is closed to the resonant frequency of one channel than it is to the other, the output from the difference circuit will be a positive going signal as shown in FIG. 7. On the other hand, if the fundamental frequency of the input signal bursts is closer to the resonant frequency of the other channel, the difference circuit output will be a negative going signal as shown in FIG. 8. Thus, it will be seen that with this circuit, it is possible to detect the departure of the fundamental frequency of input signal bursts from a center frequency. Then by returning one or both of the tuned circuits until the difference circuit output is zero, the fundamental frequency of the incoming bursts can be determined, as by calibrating the dials of the tunable L or C elements in terms of frequency using known frequency standards.

On the other hand, the output of the differential amplifier or difference circuit 25 can be used to trigger an external circuit to indicate departures beyond a chosen range of values of the characteristic of the object represented by the fundamental frequency of the incoming signal burst. As shown in FIG. 1, the output from the differential amplifier can be fed to a differential relay 26 so that when the incoming signal burst is within a selected frequency range between the resonant frequencies of the two L–C–R circuits, contacts 27 will remain closed, thereby lighting safe light 28. However, should the fundamental frequency depart from this range, the relay will be reversed, opening contacts 27 and closing contacts 29 to light a warning light 30. Similarly, a differential recorder 31 can be hooked to the differential amplifier output so as to make a record of the variations in the fundamental frequency.

At this point, it should be pointed out that the higher the Q of the two tuned L–C–R circuits, the more sensitive and accurate will be the determination of the departure of the fundamental frequency from the center frequency. This will be apparent from an observation of FIG. 1A which shows the frequency response curves for the two tuned circuits. Thus, as the Q of the two circuits increases and as the resonant frequencies are brought nearer to the center frequency, the sensitivity of the circuit will increase due to the increase in slope of the two response curves. As the two resonant frequencies $F_1$ and $F_2$ are moved apart, the range of permissible excursion of the fundamental frequency of the incoming burst is broadened but the accuracy and sensitivity decrease.

In order to permit maintaining a reasonably high Q in the tuned circuits, cathode followers 32 and 32a may be inserted in the two channels to prevent the detectors 24 and 24a and amplifiers 33 and 33a from reducing the Q of the circuits.

While the circuit thus far described is capable of measuring various characteristics of an object, it is particularly adapted to be used as an ultrasonic thickness gauge. The combination of the frequency measuring circuit and the inspection circuit 20 is shown in FIG. 1. In the inspection circuit, there is a suitable pulse generator 35 connected to an electro-acoustic transducer means 36 which can be a piezo-electric crystal adapted to be shock excited by a pulse or a train of pulses from the generator 35 to generate an ultrasonic signal. This signal is transmitted to the object 37 to be inspected via a suitable coupling medium 38, such as water. The reflected signal in turn excites transducer 36, or a separate transducer if desired, to provide an electrical signal at the original transducer frequency. When the ultrasonic signal is first emitted by the transducer, it will pass through the coupling medium to the object where a portion of it will be reflected back to the transducer as a top surface echo. The remainder of the signal will pass into the object until it reaches the bottom side thereof, or a region of change of acoustic impedance, at which point a portion of the energy will be reflected back toward the top side of the object. When the wave reaches the top side, a portion of it will be reflected back to the bottom of the object while the remainder emerges from the object to be transmitted by the coupling medium to the transducer. The reflection of the wave back and forth between the top and bottom of the object continues until the wave is damped out. Each time the wave is reflected from the top surface, a portion of it is transmitted to the transducer to ring the same and produce a burst of electrical oscillations. The recurrence rate of the echoes and hence of the bursts will be directly proportional to the thickness of the object. It will be noted that these succeeding bursts of signals result from a single ringing of the transducer by the pulse generator. These bursts of electrical oscillations are fed to a detector and amplifier 39. The output from the detector and amplifier will appear as in FIG. 2 where each peak "a" represents the detected envelope of each burst of oscillations and therefore the time between successive peaks is directly proportional to the thickness of the object. It will be noted in FIG. 2 that there are three groups of signals. Each group is formed as a result of a single ringing of the transducer by the pulse generator and hence FIG. 2 shows the transducer has been so rung three times.

In addition to the bursts of oscillations described above, the amplifier and detector 39 will also receive the transducer ringing burst emitted by the pulse generator. Usually, this will be of such large amplitude that it will be desirable to prevent it from being applied to the frequency sensing circuit. Similarly, the first pulse in the echo train may be of such large amplitude that it also should be eliminated. To avoid applying these pulses to the frequency sensing circuit, a gate 40 is suituated between amplifier 39 and the frequency circuit. This gate is normally biased to off position. To turn it on at the proper time, a zero time pulse is sent from the pulse generator to a first one-shot multi-vibrator 41 to turn the multi-vibrator on. The normal period of this multi-vibrator is longer than the period which will normally be required for the initial pulse and the first echo pulse to reach the gate. Therefore, the first echo pulse is employed to open the gate. Thus, the first echo pulse signal is applied to not only the gate but also to time delay circuit 43 where it is delayed sufficiently for the first echo pulse being applied to the gate to reach the same and be rejected. At about the time the first echo pulse is rejected by the gate, the time delay pulse corresponding thereto reaches the first one-shot multi-vibrator 41 to trigger it to an off position.

This immediately causes the second one-shot multi-vibrator 42 to turn on and open the gate so that succeeding pulses in the train of pulses can pass to the frequency measuring circuit. In order to prevent the initial pulse from triggering multi-vibrator 41 (the initial pulse being that generated by the transduced when excited by the bursts from generator 35), multi-vibrator 41 is biased sufficiently negative that the initial pulse transmitted by the time delay thereto is of insufficient amplitude to turn off the first multi-vibrator. However, the multi-vibrator is designed so that the bias thereon decreases in time at such a rate that by the time the first echo pulse is received by amplifier 39 and passes through time delay 43 to the multi-vibrator, such pulse will overcome the bias and shut off multi-vibrator 41. This then causes multi-vibrator 42 to turn on gate 40 to receive succeeding pulses in the burst.

Returning now to the frequency measuring circuit, the circuit as shown in FIG. 1 increases in accuracy as the resonant frequencies of the two channels approach each other and as the Q of the tuned circuits is increased. However, in any case, the output of the differential amplifier is independent of the level and shape of the input signal if the fundamental frequency of the input burst is centered between the resonant frequencies of the two channels so that a zero difference circuit output is produced. If the incoming signal frequency departs substantially from the center frequency, the difference circuit output is not entirely independent of input signal level and wave shape. In some cases where a high degree of accuracy is not needed, no provision need be made to correct or prevent this. However, when it is desired to make the difference circuit output independent of the level and wave shape of the input signal, the amplifier 39 can be designed so that at least its last stage is driven to saturation by the input signal burst thereto, thereby causing its output to be uniform despite variations in the amplitude of the input signal. This also causes the wave shape to become more uniform.

Where a still greater degree of accuracy is desired or, with the same degree of accuracy, it is desired to use lower Q's in the tuned circuits or a broader spacing between the resonant frequencies of the two channels, the arrangement of FIG. 9 can be used. In this figure, there is shown a circuit in which there is provided a means for equalizing the output despite varying input signal levels and wave shapes. This circuit is substantially the same as FIG. 1 except that a summing circuit 45, a rectifier and filter 46 and a variable gain amplifier 47 have been added. The summing circuit algebraically adds the outputs from the two detectors 24 and 24a. The sum signal is then rectified and filtered to provide a D.C. voltage proportional to the sum and this voltage is employed to control the gain of amplifier 47. The output of the amplifier will be more nearly controlled only by the fundamental frequency of the input signal burst and will be more independent of the input signal amplitude and wave shape than is the case for FIG. 1 when the Q's of the tuned circuits and the resonant frequency spread between the channels is equal in both circuits. The output of the amplifier 47 can be used to operate relays or other suitable devices for indicating or recording changes in the fundamental frequency in a manner similar to that indicated in FIG. 1.

From the foregoing, it will be appreciated that the circuit of this invention is especially suited for high speed thickness inspection of such objects as pipes, plates, etc. It will be seen that the response time of the elements of this circuit is very small and the circuit does not employ energy storage techniques for accumulating data. Thus, in some previous circuits, there was employed a storage capacitor in which the charge was proportional to thickness and variations in the charge where taken as variations in the thickness of the object. This necessarily resulted in a relatively slow response.

It should also be pointed out that with the use of the two-channel circuit, it is possible to readily determine if the thickness of an object departs from a selected norm. For example, assume that a plate is being inspected and thickness variation of 10% from the nominal is acceptable. The resonant frequencies of the two channels can be selected so that the center frequency corresponds to the nominal thickness of the plate. Then when the incoming signal burst has a fundamental frequency departing from the center frequency by an amount corresponding to more than 10% variation from the nominal, the differential relay 26 will be actuated to indicate excessive thinness or thickness. Therefore, there is no need to make a precise determination of the plate thickness but only to record or indicate the departure from an acceptable range.

From the foregoing, it will be seen that this invention is one well adapted to attain all of the ends and objects hereinabove set forth, together with other advantages which are obvious and which are inherent to the apparatus and structure.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an ultrasonic device for inspecting objects through the use of ultrasonic techniques, means for applying ultrasonic waves of short duration to an object to be inspected and converting resulting reflected ultrasonic waves into corresponding electrical signal bursts each having a fundamental frequency which is a function of a characteristic of the object being inspected; a circuit having an input connected to receive said signal bursts and having at least two channels connected in parallel with each other; each channel having an underdamped L–C–R circuit tuned to resonate at frequencies respectively above and below said fundamental frequency and also being shock excitable by a signal burst within a given frequency range to thereby generate a damped wave train when excited by such a signal, said frequency ranges of said L–C–R circuit overlapping so that a given signal shock excites both L–C–R circuits; detector means for detecting the envelopes of the damped waves trains from the L–C–R circuits, and means for comparing the outputs of said detector means to changes in the fundamental frequency of said signal bursts and hence in said characteristic of the object being tested.

2. The apparatus of claim 1 wherein said L–C–R circuits are tunable so as to vary the resonant frequency of each by different amounts from the center frequency of the two circuits.

3. In an apparatus for inspecting an object through the use of ultrasonic techniques wherein the intelligence is reflected by the fundamental frequency of a burst of oscillations, a device for measuring such frequency comprising a circuit having a plurality of channels with a common input for receiving said burst; each channel having an underdamped L–C–R circuit, said L–C–R circuits being tuned to resonate at frequencies differing from each other by a predetermined amount and also being shock excitable by signals within a given frequency range to either side of their respective resonant frequencies to thereby generate damped wave trains when excited by a signal within said frequency range, said frequency ranges overlapping so that a given signal burst excites all L–C–R circuits; detector means for each L–C–R circuit to detect the envelope of said damped wave trains; means for determining any difference in amplitude of the outputs of the detector means including variable gain amplifier means; and means for controlling the gain of said amplifier means to reduce the influence of variations of input signal level and wave shape and including means for summing the outputs of said detector means and for controlling the gain of the amplifier means in accordance with the resulting sum of the detector outputs.

4. In an ultrasonic device for inspecting objects through the use of ultrasonic techniques, means for applying ultrasonic waves of short duration to an object to be inspected and for converting resulting reflected ultrasonic waves into corresponding electrical signal bursts, each having a fundamental frequency which is a function of a characteristic of the object being inspected, a circuit having an input connected to receive said electrical signal bursts and also having a plurality of channels connected in parallel to said input; each channel having an underdamped L-C-R circuit, said L-C-R circuits being tuned to resonate at frequencies differing from each other by a predetermined amount and also being shock excitable by signals within a given frequency range to either side of their respective resonant frequencies to thereby generate damped wave trains when excited by a signal within said frequency range, said frequency ranges overlapping so that a given signal burst excites all L-C-R circuits; detector means for each L-C-R circuit to detect the envelope of said damped wave trains; means for determining any difference in amplitude of the outputs of the detector means including variable gain amplifier means; and means for controlling the gain of said amplifier means to reduce the influence of variations of input signal level and wave shape and including means for summing the outputs of said detector means and for controlling the gain of the amplifier means in accordance with the resulting sum of the detector outputs.

5. An ultrasonic device for measuring the thickness of an object comprising, means for applying ultrasonic waves of short duration to an object and for converting resulting reflected ultrasonic waves into corresponding electrical bursts such that the time between cycles in each burst is a function of the thickness of the object and therefore the fundamental frequency of the bursts is a measure of such thickness; a pair of underdamped L-C-R circuits connected in parallel to each other and each in series with said converting means, said L-C-R circuits being tuned to resonate at frequencies respectively above and below said fundamental frequency so that as said fundamental frequency changes to be closer to the resonant frequency of one L-C-R circuit than the other, the resulting damped wave train from said one circuit is of greater amplitude than that from the other; and means for measuring relative changes in amplitude of the damped wave trains to thereby determine variations in the thickness of said object.

6. The device of claim 5 wherein said measuring means includes detector means for detecting the envelopes of the damped wave trains from said L-C-R circuits, and means for measuring the difference between the amplitudes of said damped wave trains.

7. The device of claim 6 wherein said difference measuring means includes a differential relay connected to be in one operative state when the difference in amplitude of the damped wave trains is within a given range and to be moved to another operative state when the amplitude difference departs from such range.

8. The device of claim 5 wherein an amplifier is connected between the L-C-R circuits and said ultrasonic wave converting means, said amplifier being arranged so that at least one stage thereof is driven to saturation by the input thereto thereby reducing the variation in signal amplitude applied to said L-C-R circuits.

References Cited by the Examiner
UNITED STATES PATENTS

| | | | |
|---|---|---|---|
| 1,809,637 | 6/1931 | Moulton | 340—248 |
| 1,817,744 | 8/1931 | Finney | 340—248 |
| 2,672,392 | 3/1954 | Caples et al. | 73—67.8 X |
| 2,944,215 | 7/1960 | Corson | 324—81 |
| 3,114,258 | 12/1963 | Stebbins et al. | 73—67.9 |

FOREIGN PATENTS

| | | |
|---|---|---|
| 1,013,824 | 5/1952 | France. |
| 655,775 | 8/1951 | Great Britain. |
| 708,413 | 5/1954 | Great Britain. |

RICHARD C. QUEISSER, *Primary Examiner.*

JOHN P. BEAUCHAMP, JAMES J. GILL,
*Examiners.*